(12) United States Patent
Monge Alvarez et al.

(10) Patent No.: US 11,830,473 B2
(45) Date of Patent: Nov. 28, 2023

(54) EXPRESSIVE TEXT-TO-SPEECH SYSTEM AND METHOD

(71) Applicant: SAMSUNG ELECTRONICS CO., LTD., Suwon-si (KR)

(72) Inventors: Jesus Monge Alvarez, Middlesex (GB); Holly Francois, Middlesex (GB); Hosang Sung, Suwon-si (KR); Seungdo Choi, Suwon-si (KR); Kihyun Choo, Suwon-si (KR); Sangjun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 157 days.

(21) Appl. No.: 17/037,023

(22) Filed: Sep. 29, 2020

(65) Prior Publication Data
US 2021/0225358 A1 Jul. 22, 2021

(30) Foreign Application Priority Data

Jan. 21, 2020 (GB) .................................. 2000883
May 25, 2020 (KR) ........................ 10-2020-0062637

(51) Int. Cl.
*G10L 13/027* (2013.01)
*G10L 13/047* (2013.01)
(Continued)

(52) U.S. Cl.
CPC .......... *G10L 13/027* (2013.01); *G10L 13/047* (2013.01); *G10L 13/06* (2013.01);
(Continued)

(58) Field of Classification Search
CPC ....... G10L 13/00; G10L 13/02; G10L 13/027; G10L 13/033; G10L 13/0335;
(Continued)

(56) References Cited

U.S. PATENT DOCUMENTS

| | | | |
|---|---|---|---|
| 2002/0065655 A1* | 5/2002 | Gournay | G10L 19/0018 704/241 |
| 2010/0235166 A1* | 9/2010 | Bardino | A63F 13/54 704/207 |

(Continued)

FOREIGN PATENT DOCUMENTS

WO 2019/139428 A1 7/2019

OTHER PUBLICATIONS

Skerry-Ryan et al. "Towards End-to-End Prosody Transfer for Expressive Speech Synthesis with Tacotron". arXiv:1803.09047v1 [cs.CL] Mar. 24, 2018 (Year: 2018).*

(Continued)

*Primary Examiner* — Jesse S Pullias
(74) *Attorney, Agent, or Firm* — Sughrue Mion, PLLC

(57) ABSTRACT

A system for synthesising expressive speech includes: an interface configured to receive an input text for conversion to speech; a memory; and at least one processor coupled to the memory. The processor is configured to generate, using an expressivity characterisation module, a plurality of expression vectors, wherein each expression vector is a representation of prosodic information in a reference audio style file, and synthesise expressive speech from the input text, using an expressive acoustic model comprising a deep convolutional neural network that is conditioned by at least one of the plurality of expression vectors.

21 Claims, 14 Drawing Sheets

(51) Int. Cl.
  *G10L 15/06* (2013.01)
  *G10L 15/187* (2013.01)
  *G10L 13/06* (2013.01)

(52) U.S. Cl.
  CPC .......... *G10L 15/063* (2013.01); *G10L 15/187* (2013.01); *G10L 2015/0635* (2013.01)

(58) Field of Classification Search
  CPC ....... G10L 13/04; G10L 13/047; G10L 13/06; G10L 13/08; G10L 13/10; G10L 2013/105; G10L 21/00; G10L 21/003; G10L 21/04; G10L 21/043; G10L 25/00; G10L 25/24; G10L 25/30; G10L 25/63; G06F 3/16; G06F 40/00; G06F 40/20; G06F 40/40
  See application file for complete search history.

(56) References Cited

U.S. PATENT DOCUMENTS

| | | |
|---|---|---|
| 2015/0186359 A1 | 7/2015 | Fructuoso et al. |
| 2018/0061439 A1* | 3/2018 | Diamos .................. G10L 15/24 |
| 2019/0122651 A1 | 4/2019 | Arik et al. |
| 2019/0172443 A1 | 6/2019 | Shechtman et al. |
| 2020/0027444 A1* | 1/2020 | Prabhavalkar .......... G10L 25/30 |
| 2020/0035216 A1* | 1/2020 | Yang ....................... G06F 40/14 |
| 2020/0372897 A1* | 11/2020 | Battenberg ............. G06N 3/084 |
| 2020/0402497 A1* | 12/2020 | Semenov ................ G10L 13/10 |

OTHER PUBLICATIONS

Tachibana et al. "Efficiently Trainable Text-to-Speech System Based on Deep Convolutional Networks with Guided Attention". arXiv:1710.08969v1 [cs.SD] Oct. 24, 2017 (Year: 2017).*
Valin et al. "LPCNet: Improving Neural Speech Synthesis Through Linear Prediction", arXiv:1810.11846v1 [eess.AS] Oct. 28, 2018 (Year: 2018).*
King, S., "A beginners' guide to statistical parametric speech synthesis", Jun. 2010, The Centre for Speech Technology Research, University of Edinburgh, 16 pages total.
Zen, et al., "Statistical parametric speech synthesis", Apr. 2009, Speech Communication, vol. 51, 26 pages total.
Zen, et al., "Statistical parametric speech synthesis using deep neural networks", 2013, IEEE, 5 pages total.
Shen, et al., "Natural TTS synthesis by conditioning WaveNet on Mel spectrogram predictions", Feb. 2018, 5 pages total.
Wang, et al., "Style Tokens: Unsupervised Style Modeling, Control and Transfer in End-to-End Speech Synthesis", May 2018, 11 pages total.
Tachibana, et al., "Efficiently trainable text-to-speech system based on deep convolutional networks with guided attention", Oct. 2014, 5 pages total.
Van Den Oord, et al., "WaveNet a generative model for raw audio", Sep. 2016, 15 pages total.
Valin, et al., "LPCNet improving neural speech synthesis through linear prediction", Feb. 2019, 5 pages total.
Sotelo, et al., "Char2Wav end-to-end speech synthesis", Jan. 2017, ICLR, 6 pages total.
He, et al., "Deep Residual Learning for Image Recognition", Dec. 2015, 12 pages total.
Skerry-Ryan, et al., "Towards End-to-End Prosody Transfer for Expressive Speech Synthesis with Tacotron", Mar. 2018, 11 pages total.
Communication dated Jun. 19, 2020, issued by the Great Britain Intellectual Propelty Office in Great Britain Patent Application No. GB2000883.5.

* cited by examiner

NORMAL INFERENCE MODE

INFERENCE BY INTERPOLATION / EXTRAPOLATION OF TWO PRE-SAVED EXPRESSION VECTORS

EXPRESSIVE TEXT-TO-SPEECH SYSTEM AND METHOD

CROSS-REFERENCE TO RELATED APPLICATION(S)

This application is based on and claims priority under 35 U.S.C. § 119 to Korean Patent Application No. 10-2020-0062637, filed on May 25, 2020, in the Korean Intellectual Property Office, and United Kingdom Patent Application No. 2000883.5, filed on Jan. 21, 2020, in the United Kingdom Intellectual Property Office, the disclosures of which are incorporated by reference herein in their entireties.

BACKGROUND

1. Field

The disclosure relates to a method and system for text-to-speech synthesis, and in particular to a system which enables expressive speech to be synthesised from input text.

2. Description of Related Art

Generally speaking, text-to-speech (TTS) systems involve automatically converting input language (written) text into speech. A TTS system is a computer-based system which can read text aloud, which is useful for people who are visually impaired or who have reading difficulties, or to aid people who have a speech impairment. Any TTS system is composed of two main parts: a front-end natural language processing (NLP) module and a back-end digital signal processing (DSP) module. The NLP module performs analysis of input text to identify linguistic features (by, for example, performing text normalisation, or converting graphemes to phonemes, etc.), whereas the DSP module performs speech waveform generation using the linguistic features identified by the NLP module.

Currently, there are two main approaches to build a TTS system: concatenative synthesis, and statistical parametric speech synthesis (SPSS).

Concatenative synthesis is a data-driven approach which generates speech by connecting natural, pre-recorded units (such as words, syllables, diphones, phonemes, etc.). It provides very good speech quality, but it lacks flexibility since the inventory of pre-recorded units must be rebuilt every time the system needs to be updated. Additionally, the rigidity of the system makes it difficult to transfer certain speech characteristics into the synthesised speech, such as prosodic information. The prosodic information includes the elements of speech that are not individual phonetic segments, but are properties of syllables or larger units of speech, such as intonation, tone, stress and rhythm. Prosodic information may reflect various feature of the speaker or of the utterance itself, such as whether the utterance is a statement, question or command, or if the utterance includes irony or sarcasm.

The SPSS aims at building a statistical model that converts the linguistic features identified by NLP into acoustic features that can be used by a vocoder to generate the speech waveform. Related art SPSS systems include statistical acoustic models that are based on hidden Markov models (HMM). This approach has various advantages over concatenative synthesis, such as flexibility to change voice characteristics and robustness. However, a major limitation of SPSS is a degradation of speech quality due to the quality of the vocoder and/or the quality of the acoustic model based on HMM.

Recently, deep neural networks (DNN) have emerged as a powerful tool due to their ability to perform statistical modelling and the availability of the required hardware and software to implement them. FIG. 1 is a block diagram of a related art deep neural network based text-to-speech system, in which a deep neural network is used within an SPSS system to build three modules: a front-end NLP module, an acoustic model module, and a vocoder module. Over the past years, several DNN architectures have outperformed classical signal processing based state-of-the-art TTS. For example, Tacotron 2 (Shen et. al., "Natural TTS synthesis by conditioning WaveNet on Mel spectrogram predictions"), Tacotron-GST (Wang et. al., "Style tokens: unsupervised style modelling, control and transfer in end-to-end speech synthesis"), and DC-T'S (Tachibana et. al., "Efficiently trainable text-to-speech system based on deep convolutional networks with guided attention") as acoustic models, or WaveNet (van den Oord et. al., "WaveNet: a generative model for raw audio"), and LPCNet (J-M Valin and J. Skoglund, "LPCNet: improving neural speech synthesis through linear prediction") as vocoders. There have been also proposals that cover the whole pipeline—e.g., Char2Wav (Sotelo et. al., "Char2Wav: end-to-end speech synthesis"). All of the above-listed documents are incorporated by reference herein in their entireties.

Many of the aforementioned acoustic models simply generate neutral style speech. However, a more natural interaction with the listener may require synthesised speech with different styles, speaking rates and pitch. Tacotron-GST is an expressive TTS engine that performs style transfer. In this system, the user provides not only the input text but also an audio reference file with the style that must be copied in the synthesised speech. Even though Tacotron-GST provides good style transfer without severely compromising speech quality, its main disadvantages are a long training time due to the presence of many recurrent layers in its architecture, and limited controllability of the style and other speech properties like pitch or speaking rate. Moreover, neural vocoders like WaveNet require billions of floating-point operations per second (GFLOPS). Therefore, putting together an acoustic model like Tacotron-GST and a vocoder like WaveNet makes the computational complexity of the DSP part in FIG. 1 might be impracticable for deployment on devices whose computational capabilities and energy consumption are limited.

SUMMARY

Embodiments provide an improved TTS system which is able to generate expressive synthesised speech.

In accordance with an aspect of the disclosure, there is provided a system for synthesising expressive speech, including: an interface for receiving an input text for conversion to speech; at least one processor coupled to memory to: generate, using an expressivity characterisation module, a plurality of expression vectors, where each expression vector is a representation of prosodic information in a reference audio style file; and synthesise expressive speech from the input text, using an expressive acoustic model including a deep convolutional neural network that is conditioned by at least one of the plurality of generated expression vectors.

In accordance with an aspect of the disclosure, there is provided a method for synthesising expressive speech, including: generating, using an expressivity characterisation module, a plurality of expression vectors, where each expression vector is a representation of prosodic information in a reference audio style file; and synthesising expressive speech from the input text, using an expressive acoustic model including a deep convolutional neural network that is conditioned by at least one of the plurality of generated expression vectors.

In accordance with an aspect of the disclosure, there is provided a non-transitory data carrier carrying processor control code to implement the methods described herein.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
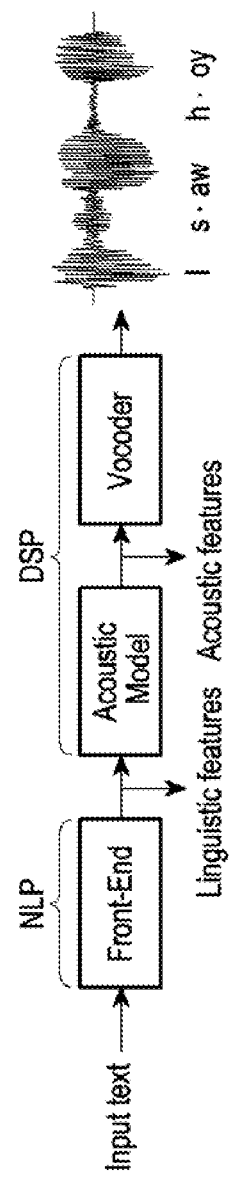
FIG. 1 is a block diagram of a related art deep neural network based text-to-speech system.

Embodiments relate to a method and system for text-to-speech synthesis, and in particular to a system which enables expressive speech to be synthesised from input text. The system enables the style of the output expressive speech to be controlled, as well as other speech characteristics such as speaking rate and pitch. Thus, embodiments provide a controllable and customisable system for generating expressive synthetic speech from text.

In an embodiment, a system for synthesising expressive speech, includes an interface for receiving an input text for conversion to speech; and at least one processor to generate, using an expressivity characterisation module, a plurality of expression vectors, where each expression vector is a representation of prosodic information in a reference audio style file; and synthesise expressive speech from the input text, using an expressive acoustic model including a deep convolutional neural network that is conditioned by at least one of the plurality of generated expression vectors.

As explained above, it is desirable to build a system for generating expressive speech which is able to be implemented on devices with limited computational capabilities or power constraints, such as consumer electronic devices (e.g. laptops and smartphones). Embodiments achieve this by providing a new acoustic model which is conditioned on expression or expressivity information, such that the output of the acoustic model includes expression.

The standard DC-TTS model reaches high efficiency by using dilated convolutional neural network layers rather than recurrent neural network layers. For example, 15 hours of DC-TTS training provides the same speech quality as 12 days of Tacotron training. However DC-TTS is not an expressive TTS system and can only reproduce neutral speech. It was also originally designed for a low-quality spectral vocoder (Griffin-Lim).

Likewise, there exist other neural vocoders which are more efficient than WaveNet. For example, LPCNet combines classical signal processing techniques with neural networks to reduce its computational load while providing equivalent speech quality to WaveNet. It requires around 2.8 GFLOPS, so real-time synthesis can be achieved on small devices such as smartphones or tablets. However it requires a different set of input features compared to spectral based vocoders such as Griffin Lim.

Embodiments include an autoregressive sequence-to-sequence acoustic model. The acoustic model is a modification of the deep convolutional text-to-speech (DC-TTS) acoustic model mentioned above, and is used with an LPCNet vocoder. The standard DC-TTS acoustic model is modified in an embodiment to produce the acoustic features required by the LPCNet vocoder. Specifically, since the standard DC-TTS acoustic model does not include expressivity and was designed for a spectral based vocoder, embodiments have modified the standard DC-TTS architecture to generate cepstral based expressive acoustic features suitable for an LPCNet vocoder, so that real-time speech synthesis can be achieved even on computationally-limited or low-power devices. The modification includes new techniques for feedback channel selection and re-shaping, a new reference encoder module, and a new expression injection method. Furthermore, embodiments enable the style of the output expressive speech to be controlled, as well as other speech characteristics such as speaking rate and pitch. Thus, embodiments provide a controllable and customisable system for generating expressive synthetic speech from text.

The expressivity characterisation module includes a trainable neural network. The expressivity characterisation module may be part of the acoustic model, or may be separate to the acoustic model. In either case, the expressivity characterisation module is used to generate expression vectors that are used to condition the deep convolutional neural network layers of the acoustic model (i.e. of the modified DC-TTS acoustic model). The expressivity characterisation module includes trainable sub-modules to characterise the expressivity of an input reference file and create a representation of this expressivity information. Its output is used as conditioning input to the expressive acoustic model—in particular, the audio decoder and optionally the audio encoder sub-modules of the acoustic model—thereby copying the reference style into the synthesised speech.

The expressivity characterisation module may include an interface for receiving a reference audio style file; and a reference encoder sub-module for compressing prosodic information of the received reference audio style file into a fixed-length vector. The reference audio style file is a pre-recorded audio file that represents a particular style or speech characteristic. For example, the reference audio style file may represent a style such as "happy". "friendly", "angry". "stem", etc., and/or may represent a speech characteristic such as fast speaking rate, slow speaking rate, higher average pitch, lower average pitch, normal average pitch, normal speaking rate, etc.

The reference encoder sub-module may include a plurality of two-dimensional convolutional layers for generating the fixed-length vector. The reference encoder sub-module may further include max pooling layers, residual connections, a gated recurrent unit (GRU) layer, and a fully-connected (FC) layer.

The expressivity characterisation module may include an attention sub-module for receiving the fixed-length vector from the reference encoder sub-module; generating a set of weights corresponding to the prosodic information of the received reference audio style file; and outputting an expression vector including the set of weights, for the reference audio style file. The expression vector may, in some cases, be a 256-dimensional expression vector, but this is a non-limiting example vector size.

In some cases, the attention sub-module may be a multi-head attention sub-module.

Instead of an attention sub-module, the expressivity characterisation module may include the reference encoder sub-module and a variational autoencoder sub-module including a plurality of fully-connected layers for receiving the fixed-length vector from the reference encoder sub-module; generating a latent space corresponding to the prosodic information of the received reference audio style file; and outputting an expression vector for the reference audio style file. The expression vector may, in some cases, be a 64-dimensional expression vector, but this is a non-limiting example vector size.

The system may further include storage for storing the expression vectors for reference audio style files generated by the expressivity characterisation module.

The expressive acoustic model includes a trainable neural network. The expressive acoustic model learns the relationship between linguistic features (e.g. phonemes) in the input text and acoustic features (e.g. the sounds corresponding to the linguistic features). In other words, the expressive acoustic model performs sequence-to-sequence modelling. The expressive acoustic model includes a number of sub-modules which may all be based on, or include, dilated convolutional layers.

The expressive acoustic model may include an audio encoder sub-module for receiving pre-recorded or pre-synthesised speech features, and generating a vector corresponding to the received speech. The expressive acoustic model may be used in two ways. Firstly, the expressive acoustic model may be used for training. i.e. to learn the above-mentioned relationship between linguistic features and acoustic features. In this case, the expressive acoustic model may be trained using input text and pre-recorded speech (or pre-synthesised speech) corresponding to the input text. For example, the input text may be the following sentence "This is a patent application for a text-to-speech synthesis system", and the pre-recorded or pre-synthesised speech is a human or computer voice reading/speaking this sentence. Secondly, the expressive acoustic model may be used in real-time to generate new synthesised speech from new input text. In this case, the expressive acoustic model may use a previous audio frame of generated speech (e.g. via auto-regression).

In some cases, the audio encoder sub-module may receive at least one of the plurality of generated expression vectors, and generate a vector corresponding to the received speech, conditioned by the received expression vector. This enables the audio encoder sub-module to take into account the expressivity represented by the received expression vector, so that the synthesised speech contains expressivity.

The step of receiving the at least one of the plurality of generated expression vectors may include receiving a user-selected expression vector. That is, a user may specify that they wish the synthesised speech to have a particular style (e.g. "happy") or a particular speech characteristic (e.g. "slow speaking rate"). Alternatively, the step of receiving the at least one of the plurality of generated expression vectors includes receiving an expression vector selected to suit a context from which the received input text is obtained. For example, if the input text is received from a news website, an expression vector may be selected to have a "sombre" or "neutral" style, so that the news is read out in an appropriate tone. In another example, if the input text is received from a story for children, expression vectors may be selected to represent a "happy" or "friendly" style and a "slow speaking rate". This selection may be automatic, based on the context.

The speech received by the audio encoder sub-module may include a plurality of audio frames, each audio frame including a feature vector. The feature vector may include twenty Bark-based cepstrum features, a period feature and a correlation feature. The twenty Bark-based cepstrum features, the period feature and the correlation feature are required by an LPCNet vocoder.

Before reaching the audio encoder, the feature vector of each audio frame is normalised and passed through a feedback channel selection module. The normalisation process may use a mean and standard deviation of the whole feature set (where the feature set is all the feature vectors that make up the input data). The original DC-TTS only generates one out of every four frames of the acoustic features per decoding step and, later, a secondary upsampling network (described as a Spectrogram Super Resolution Network or SSRN by Tachibana et. al. ("Efficiently trainable text-to-speech system based on deep convolutional networks with guided attention")) is employed to generate the remaining three frames. In an embodiment, a feedback selection channel module may be included in order to avoid this upsampling network, and so that the all the frames can be generated using the sequence-to-sequence architecture only. Thus, the final input to the audio encoder may be a plurality of audio frames that each include a feature vector containing 25 features which represent four adjacent frames of the acoustic feature set. Specifically, the 25 features may include 22 features of the first audio frame, and a DC component (i.e. the first Bark-based cepstrum coefficient) of the second, third, and fourth adjacent frames.

The expressive acoustic model may include a text encoder sub-module for generating the keys and values for a guided attention module based on the linguistic features of the input text. Thus, the text encoder sub-module may receive phonemes or graphemes corresponding to the received input text; generate a first matrix V representing the value of each phoneme or grapheme in the received input; and generate a second matrix K representing the unique key associated with each value, as explained in, for example, Tachibana et. al. "Efficiently trainable text-to-speech system based on deep convolutional networks with guided attention".

The expressive acoustic model may include a guided attention sub-module for comparing the generated matrix and the generated first and second matrices; and determining a similarity between each character in the received input text with a sound represented in the matrix. In other words, the guided attention sub-module evaluates how strongly the n-th phoneme and the t-th frame of the acoustic features are related. It is a dot-product-based attention mechanism. It is 'guided' because it applies a weighting function which exploits the fact that the relationship between the order of phonemes and the acoustic frames is nearly linear with time. This module is unchanged from the original DC-T'S as described in Tachibana et. al. "Efficiently trainable text-to-speech system based on deep convolutional networks with guided attention".

The expressive acoustic model may include an audio decoder sub-module for generating the acoustic features needed as an input to the vocoder, based on the output of the guided attention sub-module. The audio decoder sub-module may receive the generated expression vector used by the audio encoder, and generate acoustic features corresponding to an output of the guided attention sub-module, conditioned by the received expression vector. This enables the audio decoder sub-module to take into account the expressivity represented by the received expression vector, so that the output of the expressive acoustic model includes expressivity information before it is sent to the vocoder to produce synthesised speech.

The acoustic features generated by the audio decoder sub-module may represent a plurality of audio frames, each audio frame including twenty Bark-based cepstrum features, a period feature and a correlation feature. That is, the output of the audio decoder sub-module may include the features required for the vocoder (as explained above with respect to the audio encoder). The output of the audio decoder sub-module may need to be reshaped so that it is in the right format for the vocoder. This is described in more detail below.

The system may further include a vocoder for synthesising speech using the acoustic features generated by the audio decoder sub-module. The vocoder may include an LPCNet model, as described in J-M Valin and J. Skoglund, "LPCNet: improving neural speech synthesis through linear prediction".

As mentioned above, embodiments enable customisable speech to be synthesised that contains a style and speech characteristics desired by a user. However, there are many possible styles and speech characteristics, and it would be time-consuming to record reference audio style files for every style and characteristic and combination thereof, and then generate expression vectors for each such reference file. Therefore, embodiments use interpolation and extrapolation to generate desired styles and characteristics from a set of existing expression vectors.

The at least one processor coupled to memory of the system may be further configured to generate, using an interpolation and extrapolation module, a user-defined expression vector for use by expressive acoustic model to generate expressive speech from the input text.

The interpolation and extrapolation module may be configured to obtain, from storage, a first expression vector and a second expression vector, each representing a distinct style; perform a linear interpolation or extrapolation between the first expression vector and the second expression vector, using a user-defined scaler value; and generate the user-defined expression vector. Once the user-defined expression vector has been generated, the user-defined expression vector can be used, in real-time to convert new input text into expressive synthesised speech. Thus, the user-defined expression vector may be input into the expressive acoustic model (together with new received input text) to generate expressive speech from the received input text.

According to an embodiment, there is provided a method for synthesising expressive speech, including generating, using an expressivity characterisation module, a plurality of expression vectors, where each expression vector is a representation of prosodic information in a reference audio style file; and synthesising expressive speech from the input text, using an expressive acoustic model including a deep convolutional neural network that is conditioned by at least one of the plurality of generated expression vectors.

The features of embodiments described herein apply equally within embodiments.

As will be appreciated by one skilled in the art, embodiments may be embodied as a system, method or computer program product. Accordingly, embodiments may take the form of an entirely hardware, an entirely software, or a combination of software and hardware aspects.

Furthermore, embodiments may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of embodiments may be written in any combination of one or more programming languages, including object oriented programming languages and related art procedural programming languages. Code components may be embodied as procedures, methods or the like, and may include sub-components which may take the form of instructions or sequences of instructions at any of the levels of abstraction, from the direct machine instructions of a native instruction set to high-level compiled or interpreted language constructs.

Embodiments also provide a non-transitory data carrier carrying code which, when implemented on a processor, causes the processor to carry out any of the methods described herein.

Embodiments further provide processor control code to implement the above-described methods, for example on a general purpose computer system or on a DSP. Embodiments also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments described herein may include source, object or executable code in a related art programming language (interpreted or compiled) such as Python, C, or assembly code, code for setting up or controlling an Application Specific Integrated Circuit (ASIC) or Field Programmable Gate Array (FPGA), or code for a hardware description language such as Verilog® or Very high speed integrated circuit Hardware Description Language (VHDL). As the skilled person will appreciate, such code and/or data may be distributed between a plurality of coupled components in communication with one another. Embodiments may include a controller which includes a microprocessor, working memory and program memory coupled to one or more of the components of the system.

It will also be clear to one of skill in the art that all or part of a logical method according to embodiments may suitably be embodied in a logic apparatus including logic elements to perform the steps of the above-described methods, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Embodiments may be realised in the form of a data carrier having functional data thereon, said functional data including functional computer data structures to, when loaded into a computer system or network and operated upon thereby, enable said computer system to perform all the steps of the above-described method.

Figure 2:
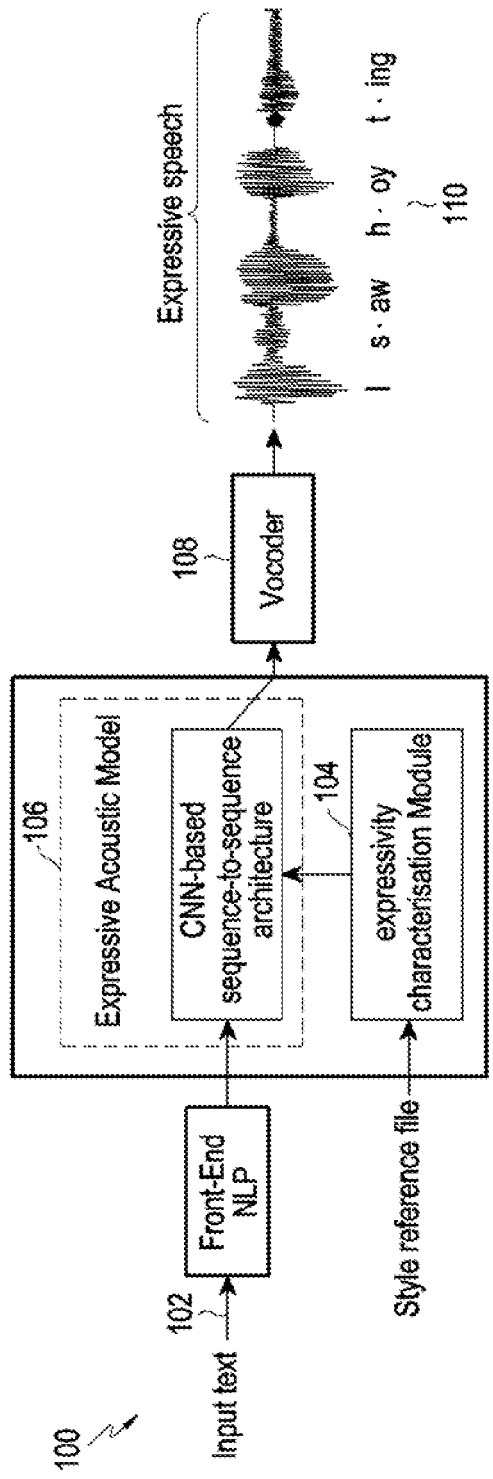
FIG. 2 is a block diagram of an expressive text-to-speech synthesis system according to an embodiment.

FIG. 2 is a block diagram of a system 100, e.g., an expressive text-to-speech synthesis system, according to an embodiment. As mentioned above, the expressive speech synthesis system is a modification of existing deep neural-network based SPSS systems (as shown in FIG. 1). The system 100 may be entirely implemented within an apparatus, such as a consumer electronic device. The consumer electronic device may be any user device, such as, but not limited to, a smartphone, tablet, laptop, computer or computing device, virtual assistant device, robot or robotic device, consumer good/appliance (e.g. a smart fridge), an internet of things device, or image capture system/device. Some parts or functions of the system 100 may be distributed across devices, e.g. cloud storage or cloud-based/remote servers.

The system 100 includes an interface 102 for receiving an input text for conversion to speech, and an output interface 110 for outputting the synthesised speech. The system 100 may include other interfaces that enable the system to receive inputs and/or generate outputs (e.g. user selections of expression vectors, etc.)

The system 100 includes at least one processor coupled to memory to: generate, using an expressivity characterisation module 104, a plurality of expression vectors, where each expression vector is a representation of prosodic information in a reference audio style file; and synthesise expressive speech from the input text, using an expressive acoustic model 106, such as Text2Cepstrum, including a deep convolutional neural network that is conditioned by at least one of the plurality of generated expression vectors.

The at least one processor or processing circuitry controls various processing operations performed by the system 100, such as executing all or part of the neural network(s) of system 100. The processor may include processing logic to process data and generate output data in response to the processing. The processor may include one or more of: a microprocessor, a microcontroller, and an integrated circuit. The processor may itself include computing resources that are available to the system 100 for executing a neural network. That is, the system 100 may include one or more of: a central processing unit (CPU), a graphics processing unit (GPU), a neural processing unit (NPU), and a DSP. Any of these computing resources may be used by the system 100 to execute all or part of the neural network(s).

The system 100 may include a vocoder 108 for synthesising and outputting speech via the output interface 110 using the acoustic features generated by the expressive acoustic model 106. The vocoder may include an LPCNet model, as described in J-M Valin and J. Skoglund, "LPCNet: improving neural speech synthesis through linear prediction".

The system 100 may include storage for storing expression vectors for reference audio style files generated by the expressivity characterisation module 104. Storage may include a volatile memory, such as random access memory (RAM), for use as temporary memory, and/or non-volatile memory such as Flash, read only memory (ROM), or electrically erasable programmable ROM (EEPROM), for storing data, programs, or instructions, for example.

Figure 3:
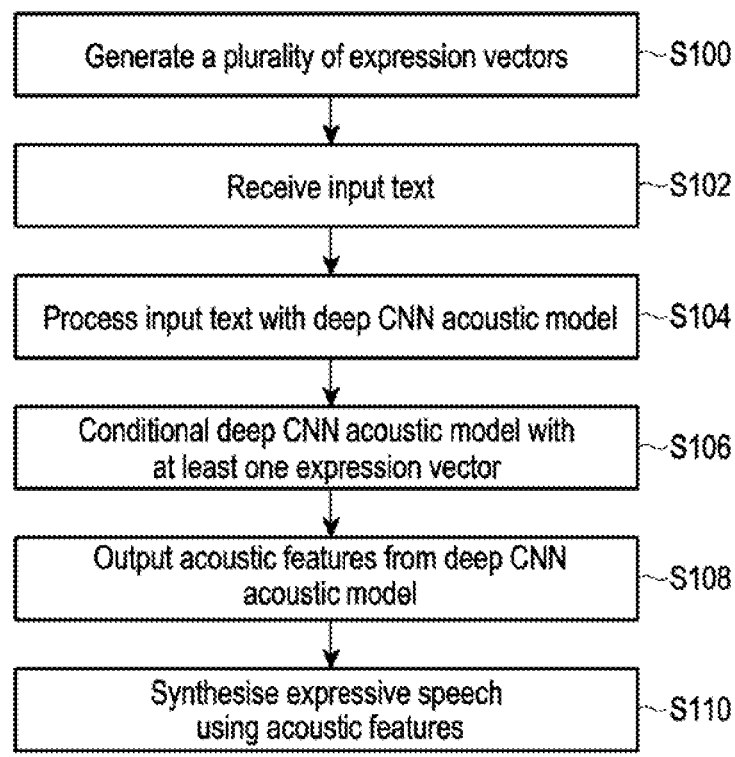
FIG. 3 is a flowchart of example steps for synthesising expressive speech using the system of FIG. 2 according to an embodiment.

FIG. 3 is a flowchart of example steps for synthesising expressive speech using the system of FIG. 2. As will be explained below, once the acoustic model of the system has been trained, the acoustic model can be used to synthesise expressive speech from input text in real-time or near-real-time. In order to include expressivity in the speech, expressivity information is injected into the acoustic model. This is achieved by generating, using the expressivity characterisation module, a plurality of expression vectors, where each expression vector is a representation of prosodic information in a reference audio style file (step S100). The method includes receiving input text that is to be synthesised into speech (step S102). The method includes synthesising expressive speech from the input text, using an expressive acoustic model including a deep convolutional neural network that is conditioned by at least one of the plurality of generated expression vectors (steps S104 and S106). More specifically, the method includes outputting acoustic features from the acoustic model (step S108) and inputting these acoustic features into a vocoder to synthesise expressive speech using the acoustic features (step S110).

Figure 4A:
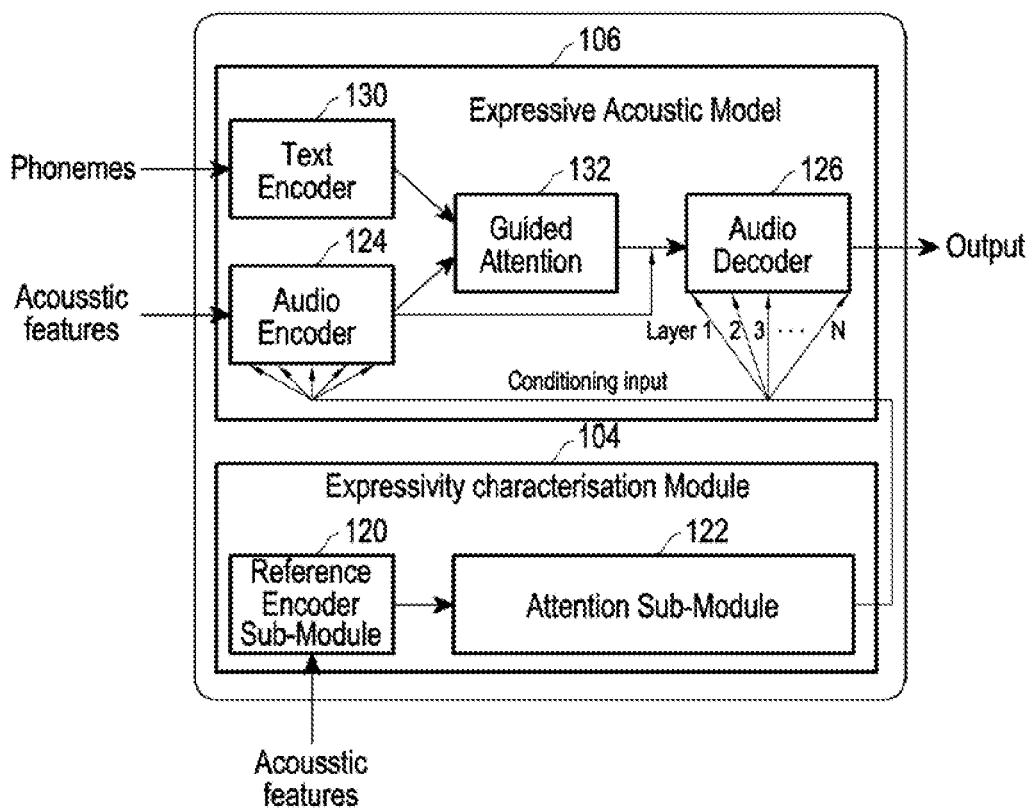
FIG. 4A is a block diagram of an acoustic model and an example expressivity characterisation module of the system of FIG. 2 according to an embodiment.

FIG. 4A is a block diagram of an expressive acoustic model 106 and an expressivity characterisation module 104 of the system of FIG. 2. In some of the related art acoustic models mentioned above, expressivity information is combined with the speech synthesis using a concatenation of the vectors at the input of an attention module. This technique works well with complex recurrent acoustic models like Tacotron GST, however this technique is not effective when used with an efficient convolutional sequence-to-sequence model (such as the present acoustic model described herein), and no expressivity is obtained. To achieve expressive synthesis with this type of architecture a novel method of expression injection was developed.

The expressive acoustic model 106 of embodiments learns the relationship between linguistic features (e.g. phonemes) in the input text and acoustic features (e.g. the sounds corresponding to the linguistic features). In other words, the expressive acoustic model performs sequence-to-sequence modelling. The expressive acoustic model includes a number of sub-modules which may all be based on, or include, dilated convolutional layers.

The novel expression injection technique includes a conditioning weighting technique, which is applied to all convolutional layers of the audio encoder and/or audio decoder modules. In an embodiment shown in FIG. 4A, the conditioning is applied to both the audio encoder 124 and audio decoder 126. This technique combines the conditioning input—i.e., the expression vector—and the original input of dilated convolutional layers at each layer of the audio encoder and audio decoder module (see FIG. 7). In this way, the final output of the expressive acoustic model 106 serves to solve both the basic sequence-to-sequence TTS problem, and to transfer the style in the reference file by means of the corresponding expression vector.

Figure 7:
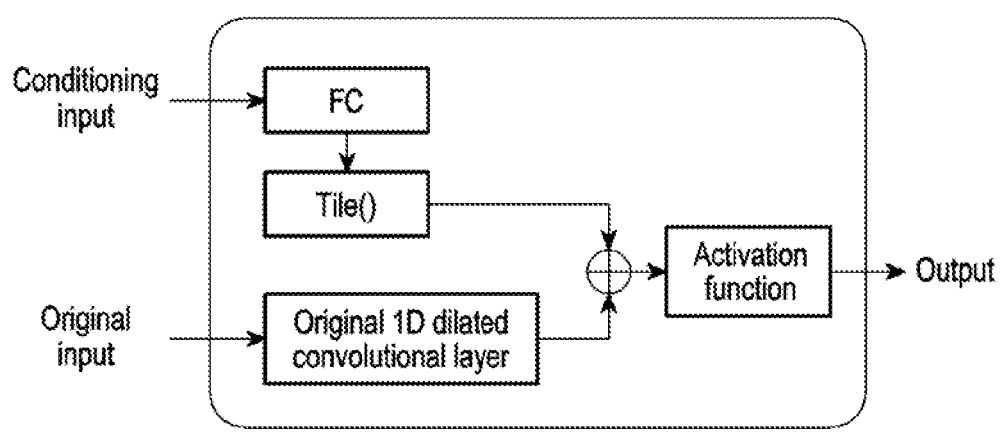
FIG. 7 is a block diagram of a 1D dilated convolutional layer with conditioning weighting according to an embodiment.

FIG. 7 is a block diagram of a 1D dilated convolutional layer with conditioning weighting. The output of the expressivity characterisation module is an expression vector that characterises the expressivity of a reference utterance. The expressive acoustic model 106 must somehow exploit this information to transfer the expressivity to the synthesised speech. As mentioned above, this new expressive acoustic model 106 applies conditioning weighting to every dilated convolutional layer of the audio encoder and/or audio decoder of the expressive acoustic model 106. Firstly, a fully-connected (FC) layer is used to convert the expression vector output by the expressivity characterisation module to a tensor of a required dimension (e.g. 256 dimensions). The tensor is tiled in the time axis to match the dimension of the output of the 1D dilated convolutional layer (of the audio decoder/encoder) in this axis. Both tensors (i.e. the output of the 1D dilated convolutional layer and the conditioning input) are element-wise added. Finally, the required activation function is applied to the result. In this way, the expressivity has been incorporated into the acoustic features generated by the audio decoder.

Figure 4B:
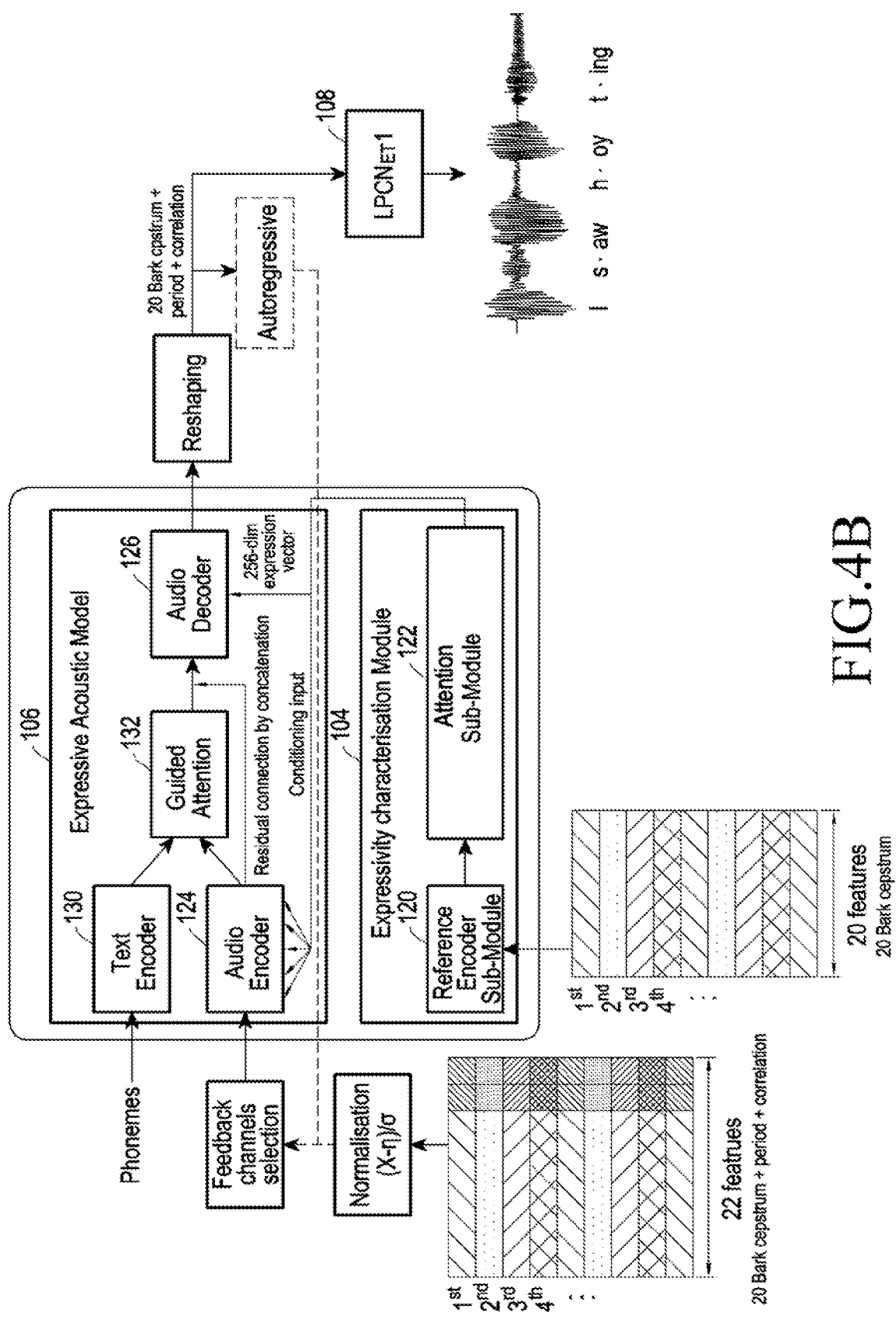
FIG. 4B is a more detailed block diagram of the system of FIG. 2 according to an embodiment.

FIG. 4B is a more detailed block diagram of the system of FIG. 2. The system includes the expressivity characterisation module 104 and the expressive acoustic model 106.

The expressivity characterisation module 104 includes a trainable neural network. The expressivity characterisation module 104 may be part of the expressive acoustic model 106, or may be separate to the expressive acoustic model 106. The expressivity characterisation module may be used during a normal inference mode or may be used to generate expression vectors during a training mode. The expressivity characterisation module might not be required in an interpolation/extrapolation inference mode, as pre-saved expression vectors are used in this mode (see FIGS. 8A to and 9B). In either case, the expressivity characterisation module 104 is used to generate expression vectors that are used to condition the deep convolutional neural network layers of the expressive acoustic model 106 (i.e. of the modified DC-TTS acoustic model). The expressivity characterisation module 104 includes trainable sub-modules to characterise the expressivity of an input reference file and create a representation of this expressivity information. Its output or a pre-saved vector is used as conditioning input to the expressive acoustic model 106—in particular, audio encoder and/or audio decoder sub-modules of the expressive acoustic model 106—thereby copying the reference style into the synthesised speech.

The expressivity characterisation module 104 may include: an interface for receiving a reference audio style file; and a reference encoder sub-module for compressing prosodic information of the received reference audio style file into a fixed-length vector. The reference audio style file is a pre-recorded audio file that represents a particular style or speech characteristic. For example, the reference audio style file may represent a style such as "happy". "friendly", "angry", "stem", etc., and/or may represent a speech characteristic such as fast speaking rate, slow speaking rate, higher average pitch, lower average pitch, normal average pitch, normal speaking rate, etc.

The reference encoder sub-module may include a plurality of two-dimensional convolutional layers for generating the fixed-length vector. The reference encoder sub-module may further include max pooling layers, residual connections, a gated recurrent unit (GRU) layer, and a fully-connected (FC) layer.

The expressivity characterisation module 104 may include: an attention sub-module 122 for: receiving the fixed-length vector from the reference encoder sub-module; generating a set of weights corresponding to the prosodic information of the received reference audio style file; and outputting an expression vector including the set of weights, for the reference audio style file. The expression vector may, in some cases, be a 256-dimensional expression vector, but this is a non-limiting example vector size. The attention sub-module 122 may be a multi-head attention (MHA) sub-module.

Figure 6:
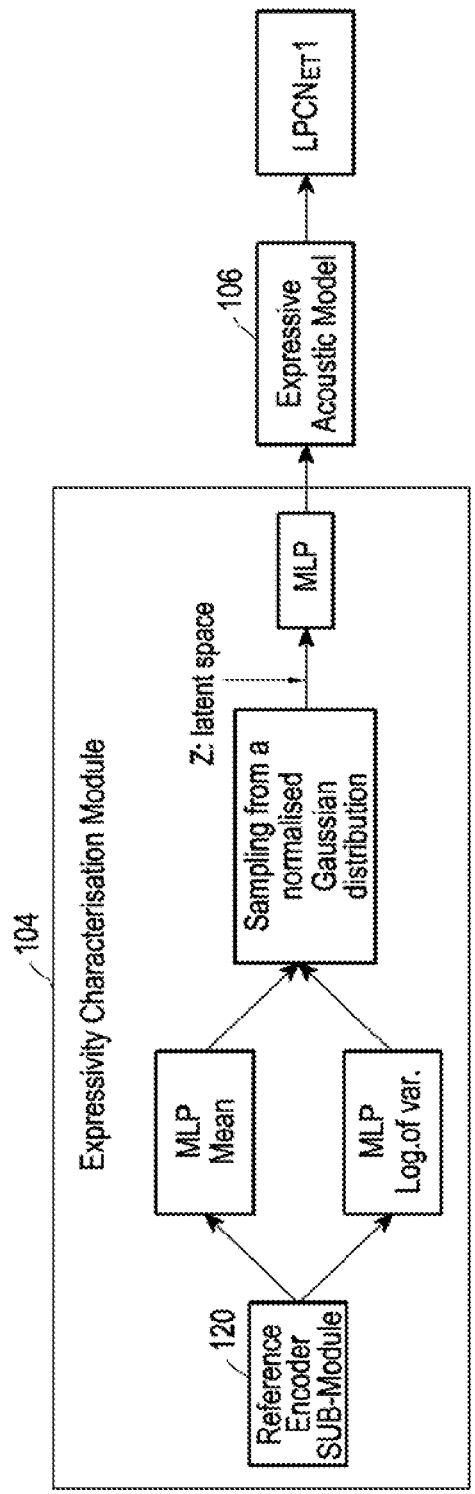
FIG. 6 is a block diagram of expressivity characterisation module of the system of FIG. 2 according to an embodiment.

Instead of an attention sub-module, the expressivity characterisation module may include the reference encoder sub-module and a variational autoencoder (VAE) sub-module. FIG. 6 is a block diagram of expressivity characterisation module of the system of FIG. 2. Here, the expressivity characterisation module includes a variational autoencoder sub-module which includes a plurality of fully-connected layers for: receiving the fixed-length vector from the reference encoder sub-module; generating a latent space corresponding to the prosodic information of the received reference audio style file; and outputting an expression vector for the reference audio style file. The expression vector may, in some cases, be a 64-dimensional expression vector, but this is a non-limiting example vector size. Thus, whether an attention sub-module or a VAE sub-module is used, the output is the same: an expression vector that is to be injected into the expressive acoustic model 106.

The expressive acoustic model 106 includes a trainable neural network. The expressive acoustic model 106 learns the relationship between linguistic features (e.g. phonemes) in the input text and acoustic features (e.g. the sounds corresponding to the linguistic features). In other words, the expressive acoustic model 106 performs sequence-to-sequence modelling. The expressive acoustic model includes a number of sub-modules which may all be based on, or include, dilated convolutional layers. As shown in an embodiment of FIG. 4B, the expressive acoustic model 106 includes four sub-modules including a text encoder 130, an audio encoder 124, a guided attention 132, and an audio decoder 126 sub-modules.

The audio encoder sub-module may be configured for: receiving pre-recorded or pre-synthesised speech features, and generating a vector corresponding to the received speech. The expressive acoustic model 106 may be used in two ways. Firstly, the expressive acoustic model may be used for training, i.e. to learn the above-mentioned relationship between linguistic features and acoustic features. In this case, the expressive acoustic model may be trained using input text and pre-recorded speech (or pre-synthesised speech) corresponding to the input text. For example, the input text may be the following sentence: "This is a patent application for a text-to-speech synthesis system", and the pre-recorded or pre-synthesised speech is a human or computer voice reading/speaking this sentence. Secondly, the expressive acoustic model may be used in real-time to generate new synthesised speech from new input text. In this case, the expressive acoustic model may use a previous audio frame of generated speech (e.g. via auto-regression).

In some cases, the audio encoder sub-module may: receive the at least one of the plurality of generated expression vectors, and generate a vector corresponding to the received speech, conditioned by the received expression vector. This enables the audio encoder sub-module to take into account the expressivity represented by the received expression vector, so that the synthesised speech contains expressivity.

The step of receiving the at least one of the plurality of generated expression vectors may include receiving a user-selected expression vector. That is, a user may specify that they wish the synthesised speech to have a particular style (e.g. "happy") or a particular speech characteristic (e.g. "slow speaking rate"). Alternatively, the step of receiving the at least one of the plurality of generated expression vectors includes receiving an expression vector selected to suit a context from which the received input text is obtained. For example, if the input text is received from a news website, an expression vector may be selected to have a "sombre" or "neutral" style, so that the news is read out in an appropriate tone. In another example, if the input text is received from a story for children, expression vectors may be selected to represent a "happy" or "friendly" style and a "slow speaking rate". This selection may be automatic, based on the context.

The speech received by the audio encoder sub-module may include a plurality of audio frames, each audio frame including a feature vector. The feature vector may include twenty Bark-based cepstrum features, a period feature and a correlation feature. The twenty Bark-based cepstrum features, period feature and correlation feature are required by an LPCNet vocoder.

Before reaching the audio encoder, the feature vector of each audio frame is normalised and passed through a feedback channel selection module. The normalisation process may use a mean and standard deviation of the whole feature set (where the feature set is all the feature vectors that make up the input data. The original DC-TTS only generates one out of every four frames of the acoustic features per decoding step and, later, a secondary upsampling network (described as a Spectrogram Super Resolution Network or SSRN by Tachibana et. al. ("Efficiently trainable text-to-speech system based on deep convolutional networks with guided attention")) is employed to generate the remaining three frames. In an embodiment, a feedback selection channel module may be included in order to avoid this upsampling network, and so that the all the frames can be generated using the sequence-to-sequence architecture only. Thus, the final input to the audio encoder may be a plurality of audio frames that each include a feature set containing 25 features which represent four adjacent frames of the acoustic feature set. Specifically, the 25 features may include 22 features of the first audio frame, and a DC component (i.e. the first Bark-based cepstrum coefficient) of the second, third, and fourth adjacent frames.

The text encoder sub-module generates keys and values for a guided attention module based on the linguistic features of the input text. Thus, the text encoder sub-module may: receive phonemes or graphemes corresponding to the received input text; generate a first matrix V representing the value of each phoneme or grapheme in the received input; and generate a second matrix K representing the unique key associated with each value, as explained in, for example, Tachibana et. al. "Efficiently trainable text-to-speech system based on deep convolutional networks with guided attention".

The guided attention sub-module may be configured for: comparing the generated matrix and the generated first and second matrices; and determining a similarity between each character or phoneme in the received input text with a sound represented in the matrix. In other words, the guided attention sub-module evaluates how strongly the n-th phoneme and the t-th frame of the acoustic features are related. It is a dot-product-based attention mechanism. It is 'guided' because it applies a weighting function which exploits the fact that the relationship between the order of phonemes and the acoustic frames is nearly linear with time. This module is unchanged from the original DC-TTS as described in Tachibana et. al. "Efficiently trainable text-to-speech system based on deep convolutional networks with guided attention".

The audio decoder sub-module generates the acoustic features needed as an input to the vocoder, based on the output of the guided attention sub-module. The audio decoder sub-module may: receive the generated expression vector used by the audio encoder, and generate acoustic features corresponding to an output of the guided attention sub-module, conditioned by the received expression vector. This enables the audio decoder sub-module to take into account the expressivity represented by the received expression vector, so that the output of the expressive acoustic model includes expressivity information before it is sent to the vocoder to produce synthesised speech.

The acoustic features generated by the audio decoder sub-module may represents a plurality of audio frames, each audio frame including twenty Bark-based cepstrum features, a period feature and a correlation feature. That is, the output of the audio decoder sub-module may be in the required format for the vocoder (as explained above with respect to the audio encoder).

The system may further include a vocoder 108 for synthesising speech using the acoustic features generated by the audio decoder sub-module. The vocoder may include an LPCNet model, as described in J-M Valin and J. Skoglund, "LPCNet: improving neural speech synthesis through linear prediction".

Before the acoustic features output by the audio decoder are provided to the vocoder 108, reshaping may be performed. As mentioned above, the new expressive acoustic model 106 must generate four acoustic features per decoding step, so no upsampling is required between the acoustic model output and the vocoder input. To achieve this, the size (i.e., number of filters) of the last convolutional layer in the audio decoder was modified from 80 (in the related art DC-TTS system) to 88. Later, this output is reshaped as shown in FIG. 4B. In this way, the new expressive acoustic model 106 is able to generate the required 22 features for the four frames of each decoding step.

A number of other modifications have been made to the acoustic model of the related art DC-TTS system in order for the modified new expressive acoustic model 106 to work with the LPCNet vocoder.

Training hyper-parameters: the original DC-TTS employed fixed rate learning. However, the new acoustic model achieves better performance when an exponentially decaying learning rate is employed.

Regularisation methods: the original DC-TTS does not use any regularisation methods. The new acoustic model employs two kind of regularisation methods: (1) Dropout—it is applied at the output of all layers of expressive acoustic model 106; and (2) L2 weight regularisation—it is applied to the weights of all layers of expressive acoustic model 106.

Training losses: the original DC-TTS was trained using the mean absolute error (MAE) between the output acoustic features and the input acoustic features, plus the loss of the guided attention module (GAtt), plus the binary divergence (BinDiv) loss: $L_{DC\text{-}TTS}=L_{MAE}+L_{GAtt}+L_{BinDiv}$. In an embodiment, the expressive acoustic model 106 computes the mean squared error (MSE) between the output acoustic features and the input acoustic features, plus the loss of the guided attention module (GAtt), plus the L2 weight regularisation loss (L2reg), plus the KL loss: $L_{NEW}=L_{MSE}+L_{GAtt}+L_{L2reg}+L_{KL}$.

Figure 5A:
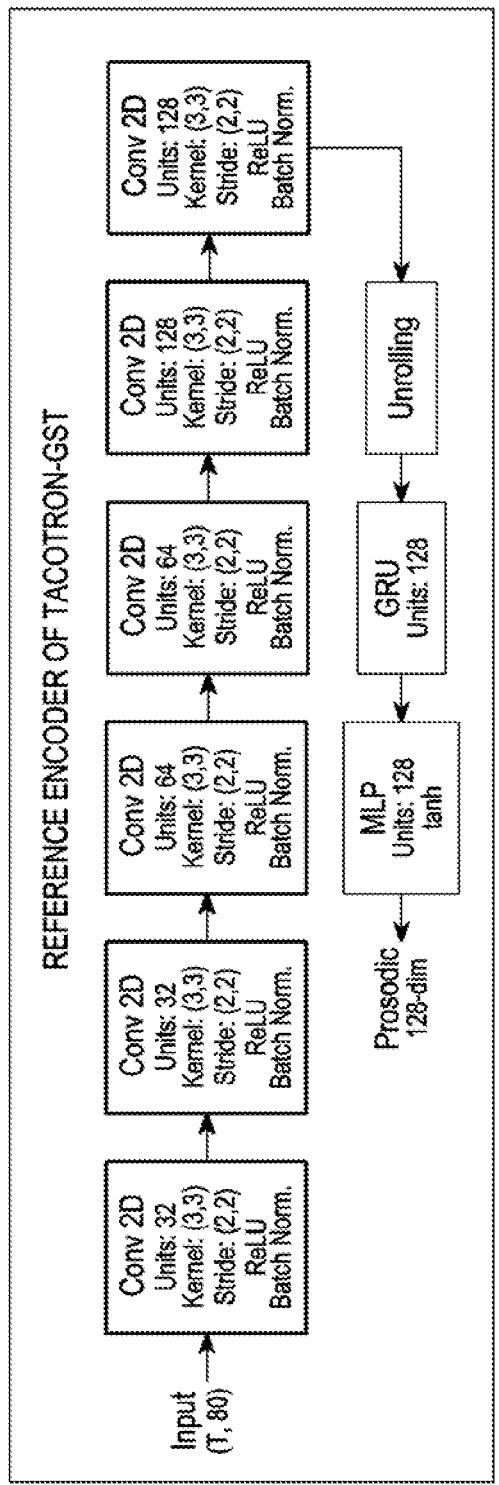
FIG. 5A is a block diagram of a related art reference encoder.
Figure 5B:
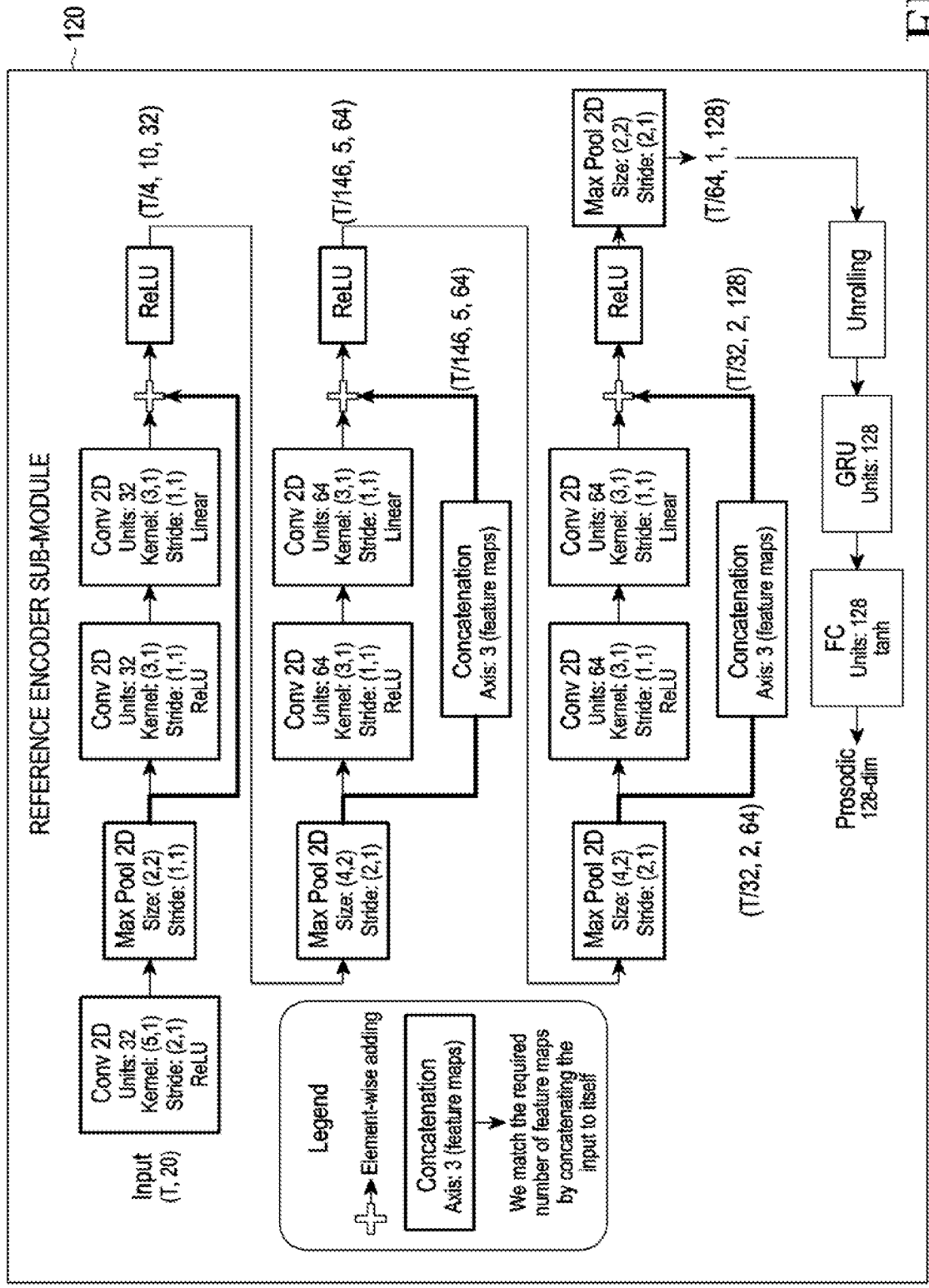
FIG. 5B is a block diagram of a reference encoder of the expressivity characterisation module according to an embodiment.

FIG. 5A is a block diagram of a related art reference encoder, and FIG. 5B is a block diagram of a reference encoder of the expressivity characterisation module. A related art reference encoder (such as that employed by Skerry-Ryan et. al., "Toward end-to-end prosody transfer for expressive speech with Tacotron", incorporated by reference herein in its entirety), requires a high dimension spectral input—e.g., 80 Mel spectral features. If this related art reference encoder architecture is used with a low dimensional cepstral input, the style transfer is severely degraded. The novel reference encoder of embodiments is designed to maintain the style transfer when used with a low dimension cepstral input (e.g. 20 Bark Cepstral features). This low dimensional cepstral input is required to avoid a domain mismatch when used with vocoders requiring a cepstral input (e.g. LPCNet).

The reference encoder sub-module 120 of the expressivity characterisation module 104 is composed of 2D convolutional layers, a GRU layer, and a fully-connected layer, as shown in FIG. 5B. The reference encoder sub-module receives, as an input, the 20 Bark-based cepstrum features (normalised versions of these features are also employed as part of the input to the audio encoder), rather than 80 Mel-based spectrum used by Skerry-Ryan et. al. Since this input is a very coarse representation of the spectral content of the signal, a more complex architecture was requited to learn a meaningful prosody. Thus, to achieve this, the new reference encoder sub-module uses a combination of residual connections and both linear and ReLU activations to boost the characterization capacity and max-pooling layers to reduce the size of feature maps. Finally, the GRU layer breaks the temporal dependency of the feature maps, so the expression of the whole utterance is represented by a single expressive vector. The fully-connected layer is employed to adapt the output to the desired range.

Figure 8A:
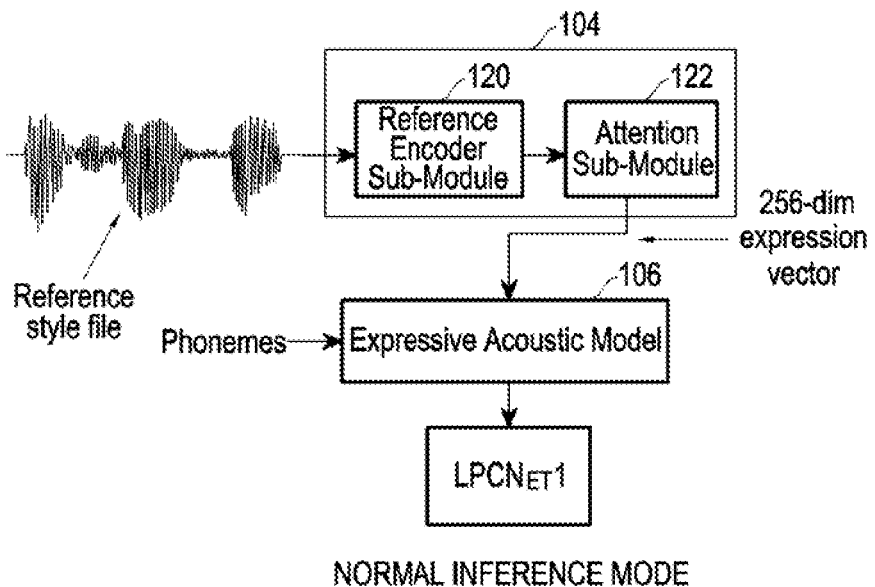
FIGS. 8A and 8B are schematic diagrams illustrating a normal inference mode for generating expression vectors using the system of FIG. 2, and an inference mode which uses interpolation/extrapolation to generate new expression vectors for further expression customisation according to an embodiment.
Figure 8B:
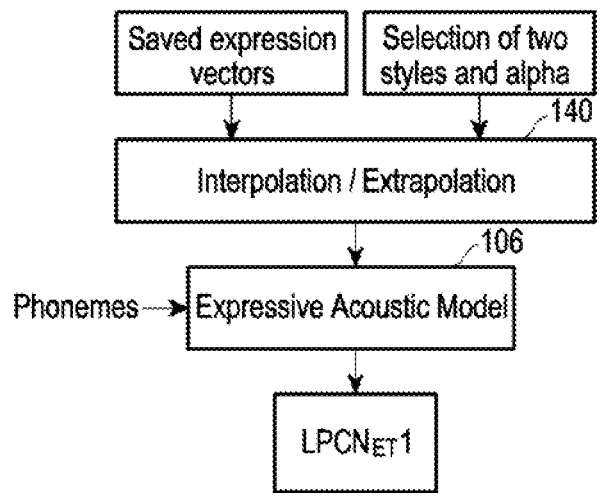

FIGS. 8A and 8B are schematic diagrams illustrating a normal inference mode for generating expression vectors using the system of FIG. 2, and an inference mode which uses interpolation/extrapolation to generate new expression vectors for further expression customisation. As mentioned above, embodiments enable customisable speech to be synthesised that contains a style and speech characteristics desired by a user. However, there are many possible styles and speech characteristics, and it would be time-consuming to record reference audio style files for every style and characteristic and combination thereof, and then generate expression vectors for each such reference file. Therefore, embodiments use interpolation and extrapolation to generate desired styles and characteristics from a set of existing expression vectors.

Thus, the at least one processor coupled to memory of the system may be further configured to: generate, using an interpolation and extrapolation module 140, a user-defined expression vector for use by expressive acoustic model to generate expressive speech from the input text.

The interpolation and extrapolation module may be configured to: obtain, from storage, a first expression vector and a second expression vector, each representing a distinct style; perform a linear interpolation or extrapolation between the first expression vector and the second expression vector, using a user-defined scaler value; and generate the user-defined expression vector. Once the user-defined expression vector has been generated, the user-defined expression vector can be used, in real-time to convert new input text into expressive synthesised speech. Thus, the user-defined expression vector may be input into the expressive acoustic model (together with new received input text) to generate expressive speech from the received input text.

More specifically, a method was designed to allow the user to control the output expression by interpolating/extrapolating between two pre-saved expression vectors representing particular styles. As shown in FIG. 8A, expression vectors (ExpVec)—i.e., the output of the expressivity characterisation module 104—for pre-recorded speech representing various different styles or speech characteristics are generated and stored. The corresponding ExpVec are interpolated/extrapolated based on the following linear function:

ExpVec_final=alpha*(ExpVec_style2−ExpVec_style1)+ExpVec_style1

The parameter alpha plays the role of a scaler:
If alpha=0, ExpVec_final equals ExpVec_style1
If alpha=1, ExpVec_final equals ExpVec_style2
If 0<alpha<1, interpolation between both styles
If alpha>1, extrapolation beyond style2
If alpha<0, extrapolation beyond style1

The resulted ExpVec (ExpVec_final) is stored, and when required, is provided as the conditioning input to the expressive acoustic model 106, as shown in FIG. 8B.

Figure 9A:
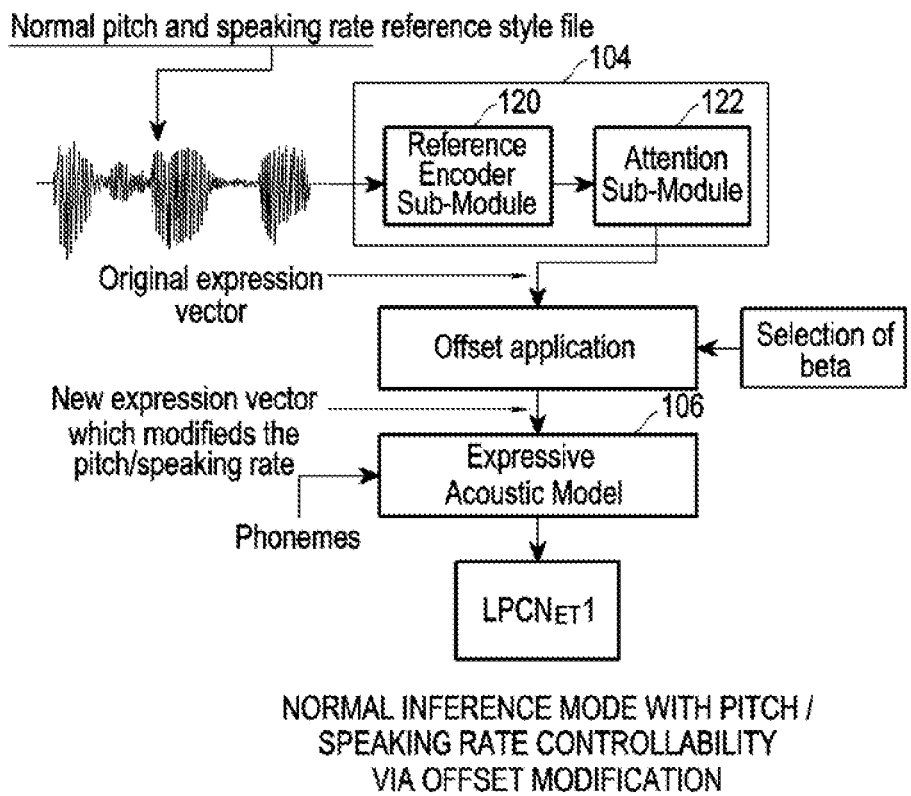
FIGS. 9A and 9B are schematic diagrams illustrating a normal inference mode for customising speech characteristics, and an inference mode which uses interpolation/extrapolation to further customise speech characteristics according to an embodiment.
Figure 9B:
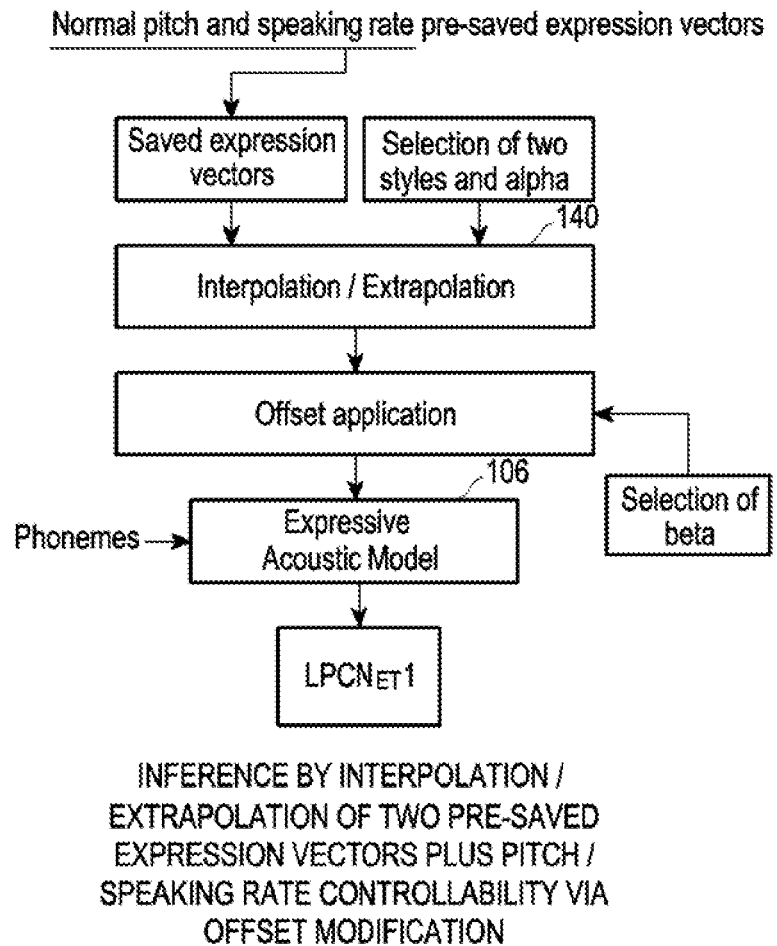

FIGS. 9A and 9B schematic diagrams illustrating a normal inference mode for customising speech characteristics (such as speaking rate and pitch variations), and an inference mode which uses interpolation/extrapolation to further customise speech characteristics.

A data augmentation procedure was designed in order to promote the learning of speaking rate and pitch variations. Two groups of 10% of training data each are evenly selected across the training data set; one of them will be used for pitch variation and the other for speaking rate variation. A standard off-line tool is used to modify: (1) the tempo without changing the pitch, for speaking rate variation learning, and (2) the pitch without changing the tempo, for pitch variation leaning. For speaking rate variation, the corresponding group is converted twice: 20% faster and 20% slower. For pitch variation, the corresponding group is also converted twice: 2 semitones up and 2 semitones down. Thus, the extra data is 40% of the original dataset. Finally, the training metadata is adapted accordingly.

In order to benefit from the data augmentation procedure, a method to control the average pitch and the speaking rate of synthesised speech was developed. This method consists of the application of an offset to the expression vector of normal pitch and speaking rate reference audio file to: keep the style, and modify the average pitch and/or speaking rate.

The first step is the offset computation. Using the normal inference mode which is shown in FIG. 8A, the expression vectors of five groups of reference files are extracted and saved: fast speaking rate, slow speaking rate, higher average pitch, lower average pitch, and normal average pitch and speaking rate.

Figure 10:
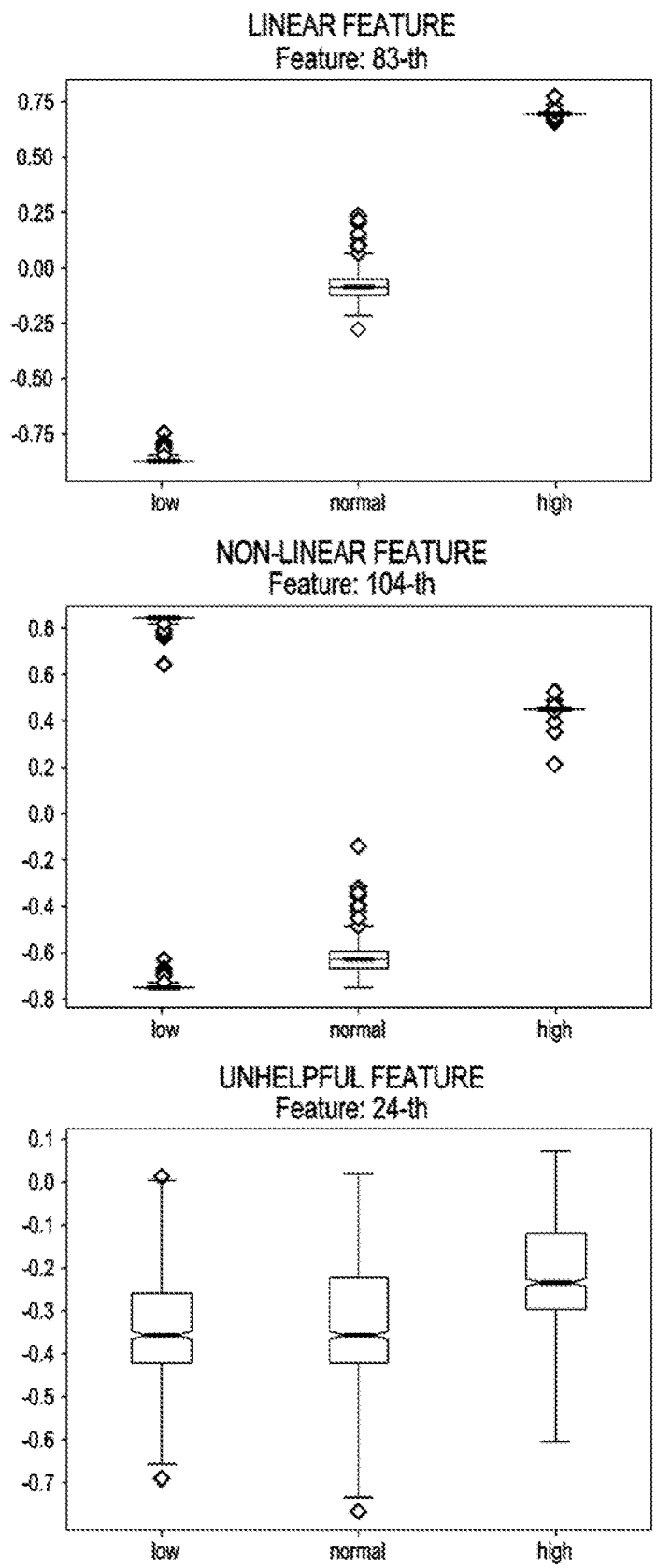
FIG. 10 shows boxplot representations of three features of an expression vector for low, normal and high pitch according to an embodiment.

Then, the features—i.e., single component of an expression vector—which exhibit a linear behaviour in relation to the pitch or the speaking rate variation are detected. FIG. 10 represents some examples by means of the boxplots of the expressive vectors in each group—specifically, boxplot representations of three features of an expression vector for low, normal and high pitch. The technique focuses only on linear features in order to account for the variability as well as to be able to interpolate/extrapolate, so the output average pitch or speaking rate are modified progressively.

Figure 11:
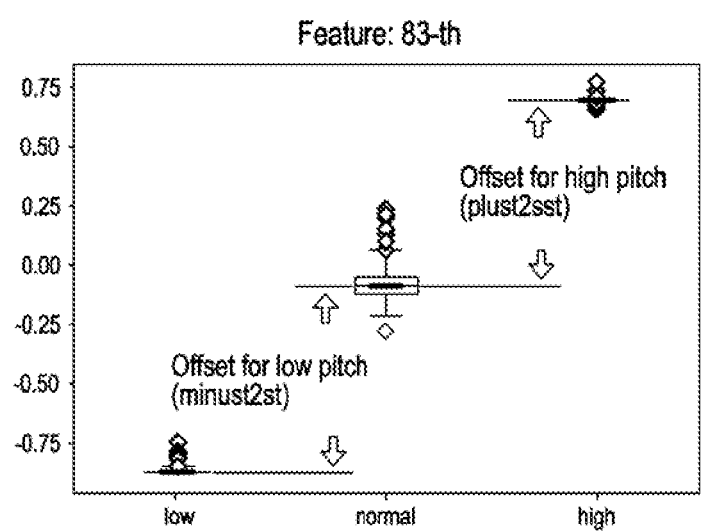
FIG. 11 shows a representation of the offset computation for a linear feature of an expression vector according to an embodiment.

The offsets of linear features are computed as the difference between the medians of the distributions generated by the aforesaid groups. This idea is depicted in FIG. 11, which shows a representation of the offset computation for a linear feature of an expression vector.

For the remaining features, the offsets are zero. At the end of this step, four offset vectors are saved: offset vector for lower pitch modification, offset vector for higher pitch modification, offset vector for slower speaking rate modification, and offset vector for faster speaking rate modification. The offset vectors can be applied both at normal inference and at inference by interpolation/extrapolation of two styles, as shown in FIG. 11. The application of the offsets is as follows:

Offset_final=beta*initial_offset, with 0<beta<1.50 where, by means of beta, the user can control the degree of change in the output pitch or speaking rate, and then:

ExpVec_final=ExpVec_original−Offset_final

The style, pitch and speaking rate modification techniques may be used both with the MHA sub-module or the VAE sub-module of the expressivity characterisation module. More specifically, when the MHA sub-module is used, speaking style (or expression) may be modified together with pitch, or speaking style may be modified together with speaking rate. When the VAE sub-module is used, all three of speaking style, pitch and speaking rate may be modified simultaneously and independently. In either case, modification techniques are compatible with each other and do not degrade speech quality. However, they increase efficiency, since by feeding the pre-saved expression vectors, the new reference encoder and MHA modules are not executed at inference time. Therefore, at inference time, the main extra computational load of the new acoustic model in comparison to original sequence-to-sequence model—called Text2Mel in original DC-TTS—is due to the FC layers for expression injection.

Thus far, modification of the original DC-TTS acoustic model has been described to provide an expressive acoustic model that is compatible with an LPCNet vocoder. An alternative implementation is to directly modify Tacotron GST (Wang et. al., "Style tokens: unsupervised style modelling, control and transfer in end-to-end speech synthesis") to work with LPCNet. This will not give the faster training times obtained when using a convolutional based acoustic model, such as the one described above, however it may be a useful modification if a Tacotron based model is already in use, and where the LPCNet vocoder is required for efficiency gains.

Like the original DC-TTS, the Tacotron-GST was designed to be used with a spectral based vocoder, so both the target and the output of the acoustic model is an 80-dimensional Mel-based spectrum. However as described previously, LPCNet requires a 22-dim feature set which includes: 20 normalised Bark-based cepstrum features, a period feature, and a correlation feature. Therefore, the input and output of the recurrent audio decoder module of the Tacotron-GST must be modified in a similar way to the input of the audio encoder and output of the audio decoder sub-modules of DC-TTS (as described above) to accommodate the LPCNet features.

The Tacotron-GST reference encoder was also designed to receive an 80-dimensional Mel-based spectrum as its input. However, if the rest of the acoustic model is modified to use the LPCNet features this will cause a mismatch that will affect style transfer and speech quality, so instead 20 non-normalised Bark-based cepstrum features must be used as the input to the reference encoder. Since this input is a very coarse representation of the spectral content of the signal, a more complex reference encoder is required to learn a meaningful prosody and obtain successful style transfer even for styles associated with a tiny pitch variation—e.g., warm style. Therefore, in order to successfully work with LPCNet, the original Tacotron-GST reference encoder should be replaced with the new reference encoder proposed herein and as described above with reference to FIG. 5B.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B." "A, B, or C," "at least one of A. B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic." "logic block," "part," or "circuitry". A module may be a single integral component, or a minimum unit or part thereof, adapted to perform one or more functions. For example, according to an embodiment, the module may be implemented in a form of an ASIC.

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Embodiments relate to a method and system for text-to-speech synthesis, and in particular to a system which enables expressive speech to be synthesised from input text. The system enables the style of the output expressive speech to be controlled, as well as other speech characteristics such as speaking rate and pitch. Thus, advantageously, embodiments provide a controllable and customisable system for generating expressive synthetic speech from text.

While embodiments have been particularly shown and described with reference to the drawings, embodiments are provided for the purposes of illustration and it will understood by one of ordinary skill in the art that various modifications and equivalent other embodiments may be made from the disclosure. Accordingly, the true technical scope of the disclosure is defined by the technical spirit of the appended claims.

What is claimed is:

1. A system for synthesizing expressive speech, the system comprising:
   an interface;
   a memory; and
   at least one processor coupled to the memory and configured to:
   control the interface to receive an input text for conversion to speech;
   receive a reference audio style file using an expressivity characterization module;
   generate, using a reference encoder sub-module and an attention sub-module of the expressivity characterization module, a plurality of expression vectors based on prosodic information in the received reference audio style file, wherein each expression vector of the plurality of expression vectors is a representation of prosodic information in the reference audio style file; and
   obtain pre-recorded or pre-synthesized speech features using an expressive acoustic model;
   synthesize expressive speech from the input text based on at least one expression vector of the plurality of expression vectors and the obtained pre-recorded or pre-synthesized speech features, using the expressive acoustic model,
   wherein the expressive acoustic model comprises a deep convolutional neural network that is conditioned by the at least one expression vector of the plurality of expression vectors,
   wherein the expressive acoustic model comprises an audio encoder sub-module and an audio decoder sub-module,
   wherein the at least one expression vector outputted from the expressivity characterization module including the reference encoder sub-module and the attention sub-module is inputted to both the audio encoder sub-module and the audio decoder sub-module of the expressive acoustic model, and
   wherein the at least one processor is further configured to:
   generate, by the audio encoder sub-module of the expressive acoustic model, a vector corresponding to the pre-recorded or pre-synthesized speech features based on the at least one expression vector, and
   generate, by the audio decoder sub-module of the expressive acoustic model, acoustic features based on the at least one expression vector.

2. The system as claimed in claim 1, wherein the expressivity characterization module comprises:
   an interface configured to receive the reference audio style file; and
   the reference encoder sub-module configured to compress the prosodic information of the received reference audio style file into a fixed-length vector.

3. The system as claimed in claim 2, wherein the reference encoder sub-module comprises a plurality of two-dimensional convolutional layers, max pooling layers and residual connections for generating the fixed-length vector.

4. The system as claimed in claim 2, wherein the attention sub-module is configured to:
   receive the fixed-length vector from the reference encoder sub-module;
   generate a set of weights corresponding to the prosodic information of the received reference audio style file; and
   output an expression vector comprising the set of weights, for the reference audio style file,
   wherein the attention sub-module is a multi-head attention sub-module.

5. The system as claimed in claim 2, wherein the expressivity characterization module further comprises a variational autoencoder sub-module comprising a plurality of fully-connected layers configured to:

receive the fixed-length vector from the reference encoder sub-module;

generate a latent space corresponding to the prosodic information of the received reference audio style file; and output an expression vector for the reference audio style file.

6. The system as claimed in claim 1, further comprising: a storage configured to store expression vectors for reference audio style files.

7. The system as claimed in claim 1, wherein the audio encoder sub-module is configured to:

receive the pre-recorded or pre-synthesized speech features and the at least one expression vector, and generate the vector corresponding to the received speech features based on the received at least one expression vector, wherein the audio decoder sub-module is configured to:

receive the at least one expression vector used by the audio encoder sub-module, and generate the acoustic features based on the received at least one expression vector.

8. The system as claimed in claim 7, wherein the audio encoder sub-module is further configured to:

generate the vector corresponding to the received speech features, conditioned by the received at least one expression vector.

9. The system as claimed in claim 8, wherein the at least one expression vector of the plurality of expression vectors comprises a user-selected expression vector.

10. The system as claimed in claim 8, wherein the at least one expression vector of the plurality of expression vectors comprises an expression vector selected to suit a context from which the received input text is obtained.

11. The system as claimed in claim 7, wherein the expressive acoustic model comprises a text encoder sub-module configured to:

receive phonemes or graphemes corresponding to the received input text;

generate a first matrix V representing a value of each phoneme or grapheme in the received input text; and generate a second matrix K representing a unique key associated with each value.

12. The system as claimed in claim 11, wherein the expressive acoustic model further comprises a guided attention sub-module configured to:

compare a generated matrix Q and the generated first and second matrices; and determine a similarity between each character in the received input text with a sound represented in the generated matrix.

13. The system as claimed in claim 12, wherein the audio decoder sub-module is configured to:

generate the acoustic features corresponding to an output of the guided attention sub-module, conditioned by the received at least one expression vector.

14. The system as claimed in claim 13, wherein the acoustic features generated by the audio decoder sub-module represent a plurality of audio frames, each audio frame comprising twenty Bark-based cepstrum features, a period feature and a correlation feature.

15. The system as claimed in claim 13, further comprising a vocoder for synthesizing speech using the acoustic features generated by the audio decoder sub-module, wherein the vocoder comprises an LPCNet model.

16. The system as claimed in claim 1, wherein the at least one processor is further configured to:

generate, using an interpolation and extrapolation module, a user-defined expression vector for use by the expressive acoustic model to generate the expressive speech from the input text.

17. The system as claimed in claim 16, wherein the interpolation and extrapolation module is configured to:

obtain, from a storage, a first expression vector and a second expression vector, each of the first expression vector and the second expression vector representing a distinct style;

perform a linear interpolation or extrapolation between the first expression vector and the second expression vector, using a user-defined scaler value; and generate the user-defined expression vector, wherein the user-defined expression vector and the received input text is input into the expressive acoustic model to generate expressive speech from the received input text.

18. The system as claimed in claim 1, wherein the pre-recorded or pre-synthesized speech features include a plurality of audio frames, and each audio frame inputted to the audio encoder sub-module includes a feature vector which represents four adjacent audio frames from among the plurality of audio frames.

19. A method for synthesizing expressive speech by a system, the method comprising:

controlling an interface of the system to receive an input text for conversion to speech;

receiving a reference audio style file using an expressivity characterization module;

generating, using a reference encoder sub-module and an attention sub-module of the expressivity characterization module, a plurality of expression vectors based on prosodic information in the received reference audio style file, where each expression vector of the plurality of expression vectors is a representation of prosodic information in the reference audio style file;

obtaining pre-recorded or pre-synthesized speech features corresponding to input text using an expressive acoustic model; and synthesizing expressive speech from the input text based on at least one expression vector of the plurality of expression vectors and the obtained pre-recorded or pre-synthesized speech features, using the expressive acoustic model, wherein the expressive acoustic model comprises a deep convolutional neural network that is conditioned by the at least one expression vector of the plurality of expression vectors, wherein the expressive acoustic model comprises an audio encoder sub-module and an audio decoder sub-module, wherein the at least one expression vector outputted from the expressivity characterization module including the reference encoder sub-module and the attention sub-module is inputted to both the audio encoder sub-module and the audio decoder sub-module of the expressive acoustic model, and wherein the synthesizing of the expressive speech comprises:

generating, by the audio encoder sub-module of the expressive acoustic model, a vector corresponding to the pre-recorded or pre-synthesized speech features based on the at least one expression vector, and generating, by the audio decoder sub-module of the expressive acoustic model, acoustic features based on the at least one expression vector.

20. A non-transitory computer-readable storage medium storing a code which, when executed by a processor, causes the processor to execute the method of claim 19.

21. The method as claimed in claim 19, wherein the obtaining of the pre-recorded or pre-synthesized speech features using the expressive acoustic model comprises receiving, by the audio encoder sub-module, the pre-recorded or pre-synthesized speech features and the at least one expression vector,
- wherein the method further comprises:
- receiving, by the audio decoder sub-module, the at least one expression vector used by the audio encoder sub-module, and
- wherein the acoustic features are generated by the audio decoder sub-module based on the received at least one expression vector.

\* \* \* \* \*